United States Patent [19]

Quigley et al.

[11] Patent Number: 5,516,290

[45] Date of Patent: May 14, 1996

[54] METHOD AND APPARATUS FOR PLAYING A BOARD GAME

[76] Inventors: Robert L. Quigley; Robert A. N. Quigley, both of P.O. Box 455, Bothell, Wash. 98011

[21] Appl. No.: 171,906

[22] Filed: Dec. 21, 1993

[51] Int. Cl.⁶ .................................................. G09B 19/22
[52] U.S. Cl. .......................... 434/129; 434/128; 434/247; 273/244; 273/249
[58] Field of Search ................... 434/128, 129, 434/247, 255; 273/244, 249, 258, 259, 236, 242, 243

[56] References Cited

U.S. PATENT DOCUMENTS

| | | | |
|---|---|---|---|
| 1,707,323 | 4/1929 | Schaffer | 273/249 |
| 2,780,463 | 2/1957 | Salomon | 273/249 |
| 3,735,986 | 5/1973 | Glass et al. | 273/249 |
| 3,921,981 | 11/1975 | Ashburn | 273/134 |
| 4,230,314 | 10/1980 | Barlow et al. | 273/441 |
| 4,234,186 | 11/1980 | Forrest et al. | 273/243 |
| 4,991,854 | 2/1991 | Weiss | 273/249 |
| 5,066,015 | 11/1991 | Sumrall | 273/243 |
| 5,135,230 | 8/1992 | Denman et al. | 273/244 |
| 5,190,292 | 3/1993 | Perry | 273/256 |
| 5,280,912 | 1/1994 | Porter | 273/244 |
| 5,318,304 | 6/1994 | Reppas | 273/244 |
| 5,322,292 | 6/1994 | Dileva et al. | 273/244 |

FOREIGN PATENT DOCUMENTS 2194895  3/1988  United Kingdom ................... 273/259

*Primary Examiner*—Gene Mancene
*Assistant Examiner*—Jeffrey A. Smith
*Attorney, Agent, or Firm*—Paul L. Griffiths

[57] ABSTRACT

A board game is disclosed wherein a plurality of players are entertained while learning lingo and safety aspects of skateboarding. A game board having a path printed thereon is provided. The pathway includes a plurality of spaces with at least a beginning space and an ending space. A die is used to indicate the number of spaces a player moves their playing piece each turn. The die is also used to determine the consequences of having to "ride" the "skate pool". Other aspects of the game include a store where safety items are purchased and a bank from which players can obtain money. The object of the game is to gather all of the safety equipment required and then land on the ending space, otherwise known as the winners circle.

17 Claims, 3 Drawing Sheets

METHOD AND APPARATUS FOR PLAYING A BOARD GAME

TECHNICAL FIELD

The present invention relates to board games, and more particularly, to a game reflecting real life experiences, for educational and entertainment purposes, of the sport of skateboarding.

BACKGROUND ART

Board games having a pathway or course printed thereon for moving playing pieces along the pathway are well known in the art. It is also well known to use some form of chance, i.e., one or more dice or a spinner having numerals thereon, for determining how many spaces contained within said pathway a player is to move their playing piece. Examples of board games are; Monopoly®, Life® and Clue®. It is not uncommon for a board game to also include some form of "chance" cards. These cards are usually picked up by a player when their playing piece lands upon a designated space on the game board. Another common aspect of board games is the use of script (play money) in varying amounts in order to pay for various items.

While most board games are directed towards the entertainment of those who play, many also include some form of educational value by providing examples of real life experiences. It has been said that Monopoly® can simulate and encourage interest in real estate investment. In this manner, board games may not only be a form of entertainment, but may also be educational.

While there are many board games directed at different real life situations, the inventors believe that no board game has ever been directed towards the sport of skateboarding. The present invention overcomes this deficiency by providing a board game having a concise and simple set of instructions, teaching safety and other aspects of the sport of skateboarding, and uses popular skate boarding lingo.

SUMMARY OF THE INVENTION

In a preferred embodiment of the present invention is a board game which includes a playing board having a representation of a pathway thereon, a plurality of squares, one of which is a beginning square, a plurality of intermediate squares, and an ending square. A plurality of the spaces or squares along the pathway include indicia, usually having skateboard lingo printed therein, to indicate an event that a player must perform. These events include a wide range of occurrences, such as advancing a number of spaces forward along the pathway, collecting script from other players, or having to "ride" the skate pool, as a few examples.

Along with the pathway, a skate pool is represented on the playing surface. When a player lands on a square labeled "skate pool", the player rolls a die with a number indicated on the die representing which of several options will occur to that player. There are squares labeled "Pick-A-Bone" which is a stack of chance cards labeled "Bone" which contain various instructions that the player must follow.

Each player is given an amount of script (money) at the beginning of the game and there are squares marked on the board for adding or subtracting to this amount of money. There is also a "Store" where, when a player lands on a square so indicated, he is given the opportunity to purchase safety equipment from the store. The object of the board game is to collect a predetermined list of safety equipment and other requirements to enable a skateboarder to participate safely in the sport. When a play has collected the required elements and has been able to move his playing piece to the winning space at the end of the pathway, that player wins the game.

BRIEF DESCRIPTION OF THE DRAWINGS

In the drawings, like reference numerals and characters refer to like parts throughout the various views, and wherein.

BEST MODE FOR CARRYING OUT THE INVENTION

Figure 1:
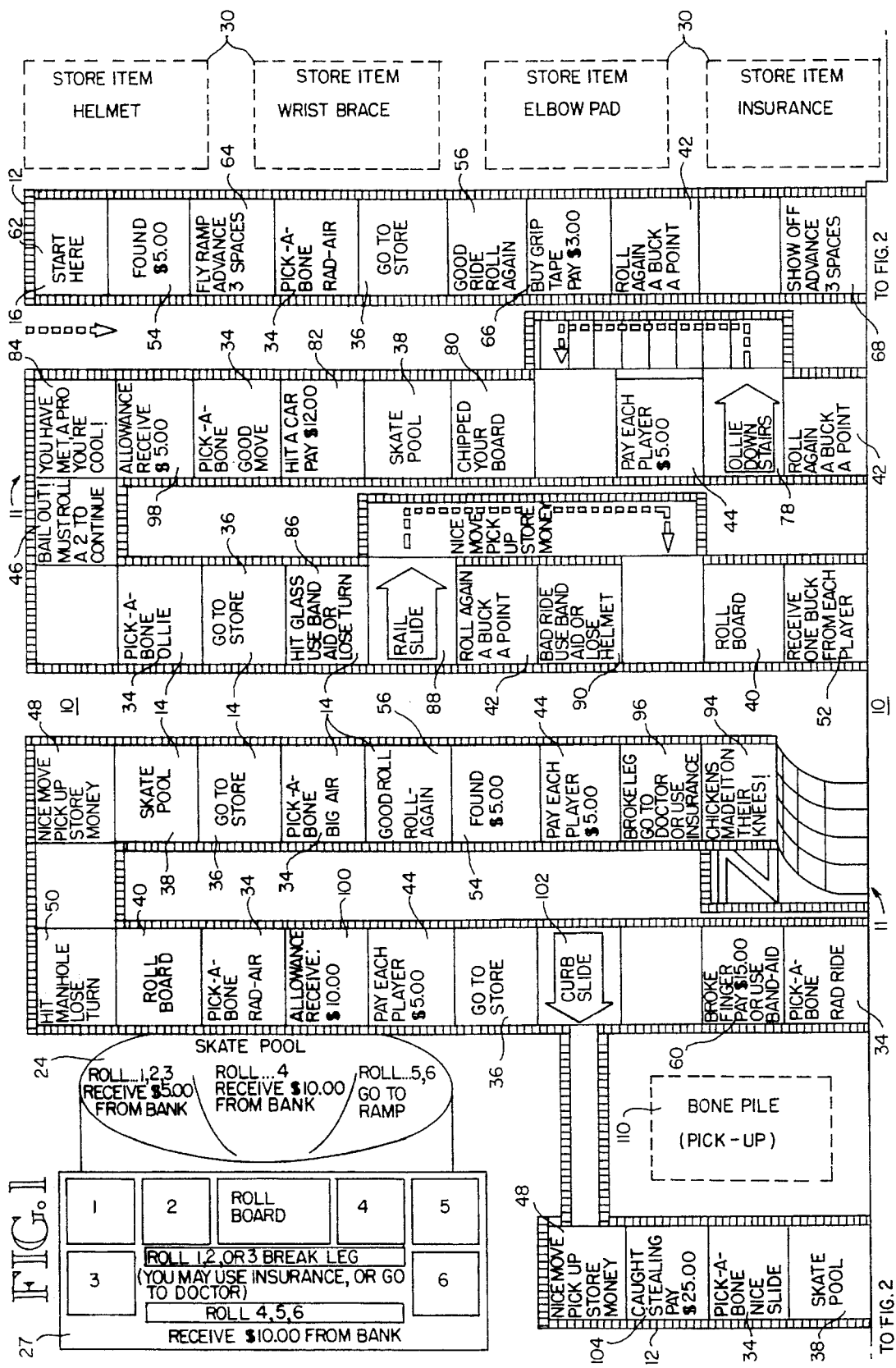
FIG. 1 is a reduced scale representation depicting one-half of a game board.
Figure 2:
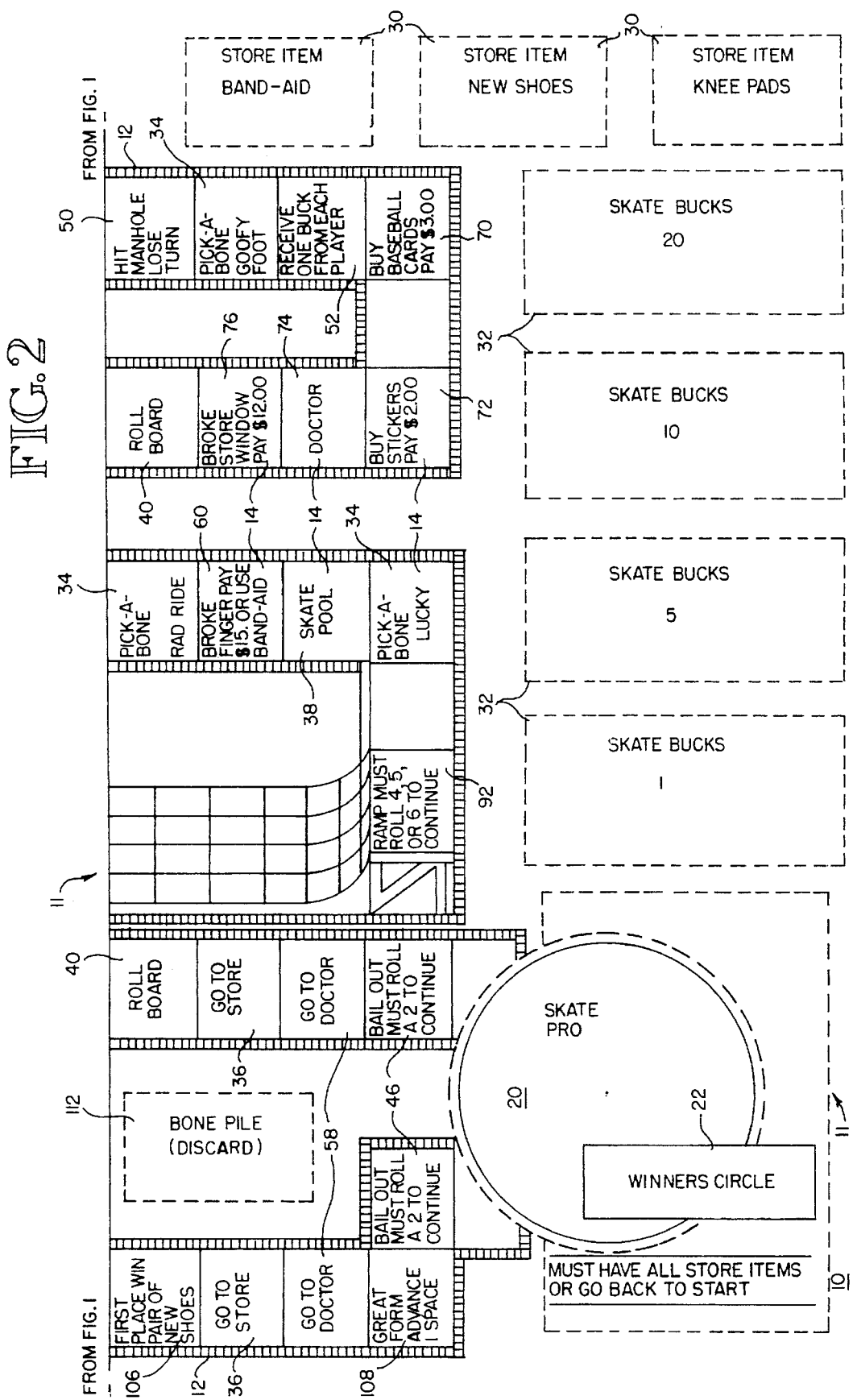
FIG. 2 is a reduced scale representation of a second half of said game board, with markings for mating up to FIG. 1.

Referring now to FIGS. 1 and 2, in combination they represent the appearance of a game board 10 of the present invention. Game board 10 includes a playing surface 11 having indicia printed thereon representing a pathway or course 12. Pathway 12 includes a plurality of spaces 14, one of which is a starting space 16, a plurality of intermediate spaces, and an ending space 20 indicated as "Winners Circle" 22 on game board 10. Printed on game board 10 is a Skate Pool 24. Skate pool 24 includes a random chance occurrence whereby a player is instructed to roll a die and then responds according to the occurrences listed in relation to each number indicated on die, as described further below. A roll board 27 is printed on game board 10. Roll board 27 is preferably located next to skate pool 24. Roll board 27 is another random chance occurrence described further below.

Figure 3:
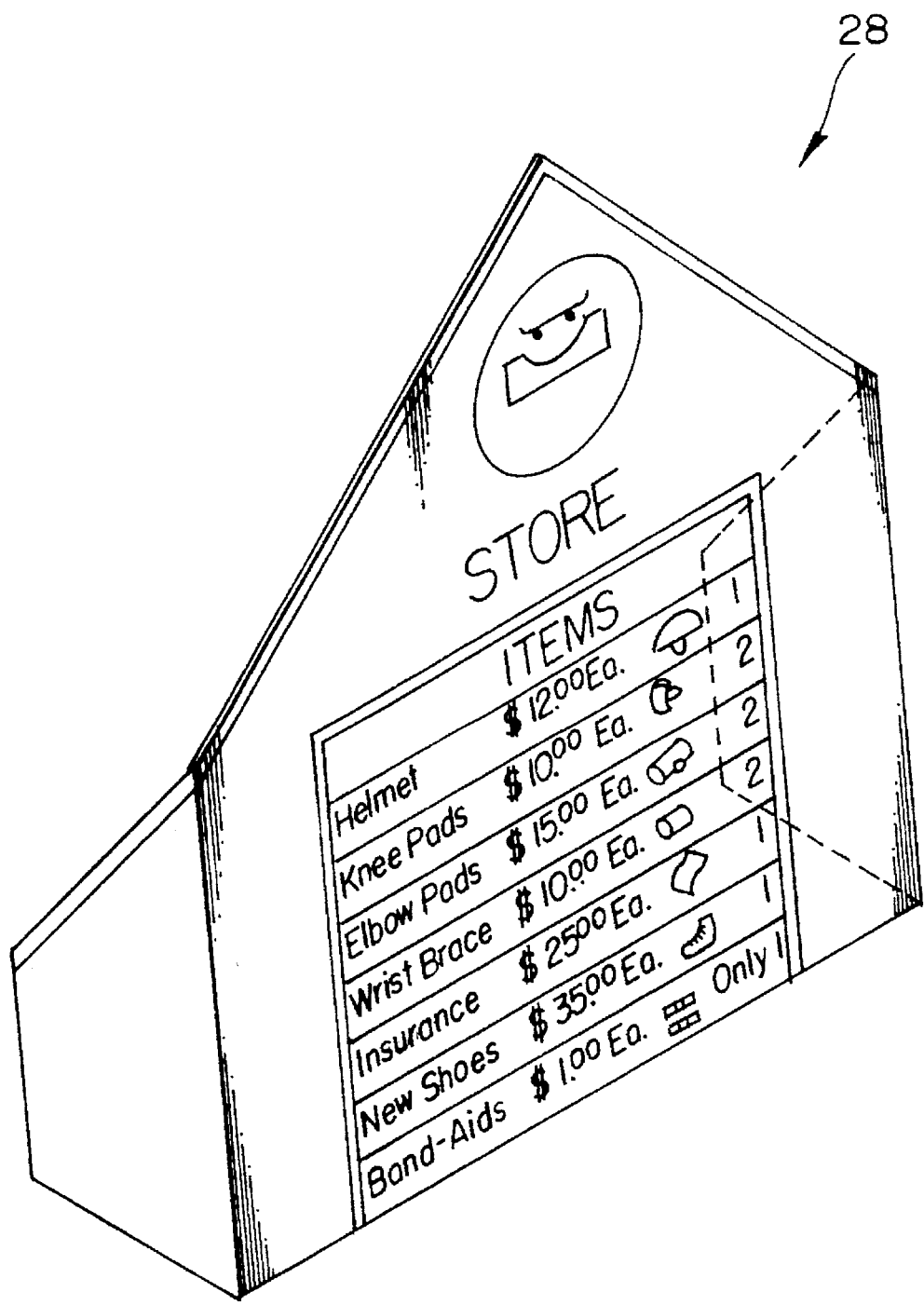
FIG. 3 is a pictorial view of a stand-up element of the game.

In FIG. 3, a Store 28 is depicted as a 3-dimensional fold-up placard having printed indicia thereon indicating the prices for safety items, as well as the quantity needed in order to win the game. Store item squares 30 printed on game board 10 with an indication as to a type of safety item. Cards representing said safety items are placed in squares 30 during a game. There are also script squares 32, where script or money is kept during a game.

An instruction booklet[1] (not shown) is included in the
1. ©1993 SPIRIT GAME CO. ALL RIGHTS RESERVED game package. The text in the instruction booklet is as follows:
Object:
The first player to get to the winners circle with all Store Items and in the right amount Wins.
To Set Up Game:
Set up Game Store upright by folding sides. (Place next to game board).
A Store Clerk must be chosen from game players. Place Store Cards on marked store item spaces on game board.
Place Bone Cards in the space marked bone pile (pick up) face down.
Place Skate Bucks $20's, $10's, $5's, and $1's, in corresponding spaces on game board. (This area is the bank).
A Banker must be chosen from game players.
Each player receives from bank five $1's, one $5, and one $10 in Skate Bucks.
Each player chooses a color playing piece and places it on Start.
Roll die, highest roll goes first then clockwise from first player.

When A Player Lands On:

ROLLBOARD Located on bottom of game board.

Player rolls die for money or a broken leg. If player breaks a leg, player must move playing piece to the Doctor space and wait for next turn to continue. Player may choose to use insurance card, then player may continue from same space on next turn.

SKATE POOL Located on bottom of game board.

Player rolls die for money or go to Ramp, if player rolls go to Ramp, player must move playing piece to Ramp space and wait for next turn to continue. On next turn player must roll a 4, 5, or 6 to continue.

GO TO DOCTOR Player must move game piece to Doctor space on game board and wait till next turn to continue. Player may not use insurance card.

PICK-A-BONE Player must pick a card from Bone pile and follow directions on card. Discards are placed face up in Bone pile (discard). An Item card is kept by player.

GO TO STORE Player may purchase as many items as can be afforded at this time only. Although only One band-aid® per turn.

BAIL OUT Player waits until next turn and must roll a two to continue.

ARROW (Symbol) Player follows arrows to indicated space and picks up store money along the way.

Additional Rules:

When a player is to cross the Ramp, on regular play, Ramp is counted as one space and player plays through to the other side and finishes count.

When a player picks up store money:

Any debts owed to the store by other players is cleared.

Money owed to other players is not.

Any debt owed to store must be paid first and then debts to other players. If a player doesn't have money to pay store or players, then that money is still owed until a player picks up store money or debt is paid.

All money received comes from bank.

All money paid by players to the store or for other reasons is placed next to the store, not on game board.

TO WIN GAME:

Player must land exactly in winners circle with All Store items cards.

Or player must return to start.

1) Insurance Card 2) Wrist Braces Cards

Helmet Card 2) Knee Pad Cards

Pair New Shoes Card 2) Elbow Pad Cards

GOOD LUCK and may the best skater win.

While each space 14 shown in FIGS. 1 and 2 is marked with a particular indicia indicating what a player landing thereon is to do, these indicia may be rearranged without any particular effect to the playing of the game. In the preferred embodiment, there are ten spaces marked pick-a-bone 34, each pick-a-bone 34 space may include a skateboarding word or phrase. Pick-a-bone 34 space lingo includes; goofy foot, good move, ollie, rad ride, lucky, big air, nice slide, and the like. There are six spaces marked go to store 36. There are four spaces marked: skate pool 38 and roll board 40; three spaces marked: roll again a buck a point 42, pay each player five bucks 44, bail out must roll a two to continue 46 and nice move pick up store money 48; two spaces each for: hit manhole lose turn 50, receive one buck from each player 52, found five bucks 54, good ride roll again 56, go to doctor 58, broke finger pay fifteen bucks or use band-aid 60, and one space each for: start here 62, fly ramp advance three spaces 64, buy grip tape pay three bucks 66, show off advance three spaces 68, buy baseball cards pay three bucks 70, buy stickers pay two bucks 72, doctor 74, broke store window pay twelve bucks 76, ollie downstairs 78, chipped your board 80, hit a car pay twelve bucks 82, you have met a pro you're cool 84, hit glass use band-aid or lose turn 86, rail slide 88, bad ride use band-aid or lose helmet 90, ramp must roll four, five, or six to continue 92, chickens made it on their knees 94, broke leg go to doctor or use insurance 96, allowance receive five bucks 98, allowance receive ten bucks 100, curb slide 102, caught stealing pay twenty-five bucks 104, first place win pair of new shoes 106 and great form advance one space 108.

As stated in the instructions above, play is initiated by each player rolling the die with the highest number going first. Players move their game pieces one space 14 for each number on die. The player does whatever the space landed on instructs to be done. In the case of skate pool spaces 38, the player rolls die and looks at skate pool 24 for the result. If the player rolls a one, two, or three, the player receives five bucks from bank, if a four is rolled, player receives ten bucks from bank, if five or six is rolled, player goes to ramp space 92.

When a player lands on roll board space 40, the player rolls die 26 again and looks for the result on roll board 27. If a one, two or three is rolled, the player breaks leg and may use insurance or must go to doctor space 74. If a four, five or six is rolled, player receives ten bucks from bank.

When a player lands on pick-a-bone space 34, player takes the top card from bone pile (pick-up) 110 and does whatever it says and then places it, face up, in bone pile (discard) 112. A bone card may be kept for future use if appropriate.

We claim:

1. An apparatus for entertainment and education comprising:

a game board, said game board having a playing surface; indicia representing a signal pathway on said playing surface, said pathway divided into a plurality of spaces, said spaces including a first space and a last space, said pathway also including at least one alternate pathway rejoining said pathway a predetermined number of spaces further along said pathway;

a free standing store display is used in conjunction with said game board, said store display having indicia thereon for indicating cost of safety items needed to be acquired by a player in order to win the game; and whereby said indicia uses skateboard lingo and a plurality of players using said apparatus move their respective playing piece along said pathway learning said lingo printed thereon.

2. The apparatus of claim 1, wherein said game board further includes a skate pool, said skate pool having indicia indicating consequences of a player rolling a die having numbers thereon.

3. The apparatus of claim 1, wherein said game board further includes a roll board, said roll board having indicia indicating consequences of a player rolling a die having numbers thereon.

4. The apparatus of claim 1, wherein a set of chance cards are associated with predetermined spaces, and a chance card square on said game board where said chance cards are stored during play.

5. The apparatus of claim 4, wherein said chance cards are defined as "bone" cards and said chance card square is defined as a "bone pile" (pick-up).

6. The apparatus of claim 4, wherein a chance card discard square on said game board is provided for receiving used chance cards.

7. The apparatus of claim 6, wherein said chance card discard square is defined as a "bone pile" (discard).

8. An apparatus for entertainment and education comprising:

a game board, said game board having a playing surface; indicia representing a single pathway on said playing surface, said pathway divided into a plurality of spaces, said spaces including a first space and a last space, said pathway also including at least one alternate pathway rejoining said pathway a predetermined number of spaces further along said pathway a plurality of safety item cards, simulating actual safety gear, are defined and a plurality of designated areas are marked on said game board for receiving same, and a player must collect one of each said plurality of safety item cards to win the game, whereby said indicia uses skateboard lingo and a plurality of players using said apparatus move their respective playing piece along said pathway learning said lingo printed thereon.

9. The apparatus of claim 8, wherein a first one of said safety items indicated on said safety item cards is a helmet.

10. The apparatus of claim 9, wherein a second one of said safety items indicated on said safety item cards is a wrist brace.

11. The apparatus of claim 10, wherein a third one of said safety items indicated on said safety item cards is an elbow pad.

12. The apparatus of claim 11, wherein a fourth one of said safety items indicated on said safety item cards is an insurance policy.

13. The apparatus of claim 12, wherein a fifth one of said safety items indicated on said safety item cards is a band-aid.

14. The apparatus of claim 13, wherein a sixth one of said safety items indicated on said safety item cards is a new pair of shoes.

15. The apparatus of claim 14, wherein a seventh one of said safety items indicated on said safety item cards is a pair of knee pads.

16. A method of learning while being entertained comprising the steps of:

moving game pieces around a game board having a plurality of spaces marked with skateboarding lingo, some of said spaces indicating what happens to a player when their game piece lands on that space;

moving said game pieces by a numeric value provided by a chance means;

obtaining money from a bank, store and other players according to indicia marked in spaces;

acquiring safety items from a store when a player's game piece lands on a space marked "go to store"; and landing in a winners circle with a predetermined list and amount of safety items.

17. The method of claim 16, wherein said spaces include;

chance occurrences from landing on skate pool, roll board and pick-a-bone spaces on said game board, whereby the player must either roll a die to determine an occurrence or pick up a bone card and do whatever it says to do.

* * * * *